3,267,173
PRODUCT AND PROCESS FOR MAKING A POLY-ETHYLENE-MALEATE DIESTER GRAFT COPOLYMER
Robert J. Zeitlin, Bloomfield, N.J., assignor, by mesne assignments, to Allied Chemical Corporation, New York, N.Y., a corporation of New York
No Drawing. Filed May 18, 1962, Ser. No. 195,987
23 Claims. (Cl. 260—878)

The present invention relates to a novel and useful graft copolymer and to a process for producing such a graft copolymer. More particularly, it relates to a high density polyethylene/maleate diester graft copolymer and to a process for preparing the graft copolymer.

As is known in the art, high density polyethylene is a relatively inexpensive and very useful polymer which is utilized in the United States in quantities of hundreds of millions of pounds annually. Processes for producing such high density polyethylenes are disclosed, for example, in U.S. Patents 2,825,721 and 2,949,447. High density polyethylene, however, while it has received widespread acceptance, suffers from certain inherent disadvantages which render it unsuitable for certain applications. For example, the high density polyethylene homopolymer is quite brittle and substantially inextensible. Similarly, both the high density polyethylene homopolymer and copolymers are quite susceptible to stress cracking and are somewhat deficient in impact resistance. Obviously, an inexpensive high density polyethylene graft copolymer which did not have the aforementioned undesirable properties would receive widespread acceptance in the art.

It is an object of the present invention to provide a high density polyethylene graft copolymer which is more flexible and more readily extendible than the original polymer. A further object is to provide a graft copolymer which has an improved notched impact brittleness temperature. Another object is to provide a high density polyethylene graft copolymer having improved impact resistance and resistance to environmental stress cracking. A still further object is to provide a high density polyethylene graft copolymer having improved clarity when processed into bottles, sheets, films, and the like. Another object is to provide a relatively simple and economical process for modifying the properties of a high density polyethylene homopolymer or copolymer. A still further object is to provide a process for forming a high density polyethylene graft copolymer which may be carried out in conventional equipment on a continuous basis. Another object is to provide a high density polyethylene graft copolymer which can be processed and shaped in the conventional manner. Other objects will become apparent as the description of the invention proceeds.

These objects are accomplished by the present invention which provides a graft copolymer of (A) a polyethylene polymer having a density of at least about 0.940 and containing at least about 90% by weight of ethylene in the polymer chain and (B) a maleic acid diester; the maleic acid diester being present in the graft copolymer in amounts of from about 0.5 to about 12% by weight.

The present invention also provides a process for producing a graft copolymer which comprises heating a composition comprising (A) from about 70 to about 99% by weight of a polyethylene polymer having a density of at least about 0.940 and containing at least about 90% by weight of ethylene in the polymer chain and (B) from about 0.5 to about 30% by weight of a maleic acid diester, to a temperature above the melting point of the said polyethylene polymer, mixing the molten composition in the presence of at least about 0.02% by weight, based on the weight of said composition, of a hydroperoxide having a half life of at least one minute at 145° C. and thereafter recovering the resulting graft copolymer.

In a preferred embodiment of the present invention, the polyethylene polymer has a density of from about 0.942 to about 0.965 and it contains at least about 98% by weight of ethylene in the polymer chain. In the preferred embodiment, each alcohol residue of the maleic acid diester is a hydrocarbon radical containing from 1 to about 18 carbon atoms, and more preferably, about 4 to about 18 carbon atoms. While the amount of the maleic acid diester present in the graft copolymer may vary somewhat, it is preferred that it be present in amounts of from about 3 to about 10% by weight.

The terminology "graft copolymer" is employed to signify that the monomeric material (maleic acid diester) reacts with the residual unsaturated groups in the polymer (polyethylene) to couple or form branches which extend the polymer chains rather than crosslink the chains with the formation of insoluble "gel."

The expression "a polyethylene polymer having a density of at least about 0.940 and containing at least about 90% by weight of ethylene in the polymer chain" signifies the conventional polyethylenes as described, for example, in U.S. Patents 2,949,447 and 2,825,721. The polymer, therefore, may be the polyethylene homopolymer or a copolymer obtained by reacting ethylene with a comonomer such as propylene; butene-1; butene-2; 3-methyl butene-1; pentene-1; hexene-1; 1,3-butadiene and the like, as well as mixtures of such comonomers. Other equally suitable comonomers are described in the aforementioned patents.

The "maleic acid diesters" suitable for use in the present invention are any having the formula

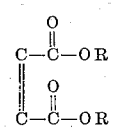

wherein each R is an organic radical. Among the various maleate diesters suitable for use in the present invention are: dimethyl maleate; dipropyl maleate; diisobutyl maleate; dibutyl maleate; dipentyl maleate; dicyclopentyl maleate; dihexyl maleate; dicyclohexyl maleate; dioctyl maleate; didodecyl maleate; dibenzyl maleate; di(2-phenylethyl) maleate; di(2-ethylhexyl) maleate; di(tetrahydrofurfuryl) maleate; p-chlorophenyl methyl maleate; methyl ethyl maleate; ethyl butyl maleate; propyl cyclohexyl maleate; phenyl ethyl maleate and the like. In a preferred embodiment of the present invention, each alcohol residue of the maleate diester is a hydrocarbon radical which contains from about 4 to about 18 carbon atoms.

The term "recovering" is employed in its broadest sense to include any system which utilizes the graft copolymer formed in the process. Thus, the term includes recovery in the form of pellets, powders and the like, as well as shaped articles formed directly from the molten polymer such as sheets, film, tubing, molded articles and the like.

Any of the hydroperoxides known in the art which have a half life of at least one minute at 145° C. may be employed for the process of the present invention. Such hydroperoxides have the general formula R—O—OH, wherein R is an organic radical. Among the suitable hydroperoxides are: t-butyl hydroperoxide; p-methane hydroperoxide; pinane hydroperoxide; and cumene hydroperoxide as well as others known in the art.

In carrying out the process of the present invention, the components of the composition are merely mixed and heated to a temperature above the melting point of the polyethylene polymer. The elevated temperature causes rapid decomposition of the hydroperoxide with formation of the graft copolymer. Obviously, the more homogeneous the mixture prior to heating, the less mixing will be required of the molten composition. However, in order to obtain a desirable conversion, it has been found that some form of mixing is highly desirable even when a uniform mixture of all of the components of the composition is formed prior to heating. In general, the composition should be heated to a temperature above about 130° C. and it is preferred to use temperatures ranging from about 270 to about 320° C. Temperatures substantially above about 325° C. are generally to be avoided in order to avoid substantial decomposition of the polymeric ingredients. However, if the decomposition products are not undesirable in the product, higher temperatures may be employed. The reaction time required is quite short, being of the magnitude of from a few seconds to about twenty minutes, although extended heating times do not substantially affect the product and may be employed when desired.

A convenient method of accomplishing the reaction is to premix the ingredients and then extrude the composition through a heated extruder. Other mixing means, such as a Banbury mixer, roll mills and the like, may also be employed for the process. In order to prevent undue increase in molecular weight with a possibility of some crosslinking at elevated temperatures, it is desirable to carry out the reaction in a closed reaction vessel. A conventional extruder accomplishes this result without the use of auxiliary equipment and for this reason is a particularly desirable reaction vessel, although it is by no means necessary.

In the specification and claims all parts are expressed in parts by weight unless otherwise stated.

The density is given in grams per cubic centimeter at 23° C. as measured in a density gradient column such as that described in "Journal of Polymer Science," vol. 21, p. 144, 1956.

The following examples are given to illustrate the invention and are not intended to limit it in any manner.

In the examples, the "melt index" is reported in decigrams per minute and is determined by the standdard ASTM-D-1238-59T test unless otherwise reported. However, for polymers having a 0.0 melt index according to this method, a modified method, designed $MI_{21}$, is sometimes employed which utilizes a 21,600 gram weight rather than a 2,160 gram weight as in the aforementioned test. All other conditions of the standard test remain the same in the modified procedure. This test merely gives a better indication of the melt index of materials which give a 0.0 measurement by the standard test.

The percent elongation, the tensile strength at yield in p.s.i. and the ultimate tensile strength in p.s.i. are measured by the standard ASTM-D-638-60T test. The stiffness in flexure expressed in p.s.i. at 110 mils is measured by the standard ASTM-D-747-58T test.

The notched impact brittleness temp. in °C. is determined by the standard ASTM-D-746-57T test except that different sample bars (.25" wide x 1.5" long x .075" thick) are cut from sheets pressed at 400° F. The sheets are cooled in the press at 25° per minute. The samples are placed in the Scott tester with the width parallel to the impact bar. A notch .015" deep is cut across the thickness with a razor sharp edge.

The environmental stress cracking time in hours is obtained using Igepal CO-630 (Antarox A400) and alkylaryl polyethylene glycol produced by General Dyestuff Corp., in accordance with the Proposed Tentative Method of Test for Environmental Stress Cracking of Type 1 Ethylene Plastics (ASTM Designation: D00-59T) as disclosed in the 1959 reprint of the Report of Committee D-20 on Plastics, pp. 17-22, at the 62nd Annual Meeting of the ASTM, June 21-26, 1959.

The impact resistance is determined by two methods. In Test 1, ten sample specimens of bottles (26 fluid ounce capacity) are blow-molded from the graft polymer and the control polymer. The bottles are dropped from various heights onto a hard (concrete) surface and checked for failure. In Test 2, a 4 pound ball is dropped from various heights onto a wash basin formed from the graft copolymer and the control. Upon failure, the height and the weight of the test ball are utilized to convert the energy of impact into foot-pounds.

The "high density" polyethylene polymers employed in the examples are prepared according to the process set forth in U.S. Patent 2,949,447 or 2,825,721. When employing the process of U.S. Patent 2,949,447, a pressure of about 450 p.s.i. is employed with a temperature of 205–210° F., a reaction time of about 2 hours and chromium oxide supported on silica/alumina as the catalyst. When employing the procedure of U.S. Patent 2,825,721, a pressure of about 450 p.s.i is employed with a reaction time of about 2 hours and chromium oxide supported on silica/alumina as the catalyst. The polymerization temperature utilized in the procedure is indicated in the examples.

In the examples, the melting point of the polymer is determined by the conventional procedure employing a polarizing microscope. The amount of the maleate diester actually incorporated into the polymer is determined on a weight-percentage basis employing infrared analysis (Perkin-Elmer Model 21 Spectrometer).

The extruders employed in the examples are of the tubular type with a screw feed. While three different extruders are actually employed in the examples, the heating chamber of each contains a plurality of zones which are maintained at different temperatures by means of an electric heating element surrounding each zone. The temperature profile is given from Zone 1 (the feed end of the machine) to the zone immediately adjacent to the extrusion die.

EXAMPLE I

*Procedure A*

A high density polyethylene copolymer containing about 1.59% of butene-1 is prepared in accordance with United States Patent 2,949,447, as previously described, to give a copolymer having a density of 0.943, a melt index of 0.0 and an $MI_{21}$ of 1.6.

848 pounds of the polyethylene copolymer are mixed in a ribbon blender with a solution of 150 pounds of dibutyl maleate and 2 pounds of t-butyl hydroperoxide. The homogeneous mixture is fed into a "Hartig" 2½ inch extruder having a length to diameter ratio of 20 to 1 and equipped with electric temperature controls covering 3 heating zones. The feed end is cooled with tap water and the screw speed is 30 r.p.m. The temperature profile is Zone 1=345° F., Zone 2=670° F., Zone 3=395° F. and die temperature=300° F. The die produces 3 strands at an extrusion rate of about 43 pounds per hour employing a pressure of 250 to 500 pounds per square inch. The strands are cut into pellets having a size of from about ⅒ to ¼ inch.

The resulting polyethylene/butene-1/dibutyl maleate graft copolymer has a density of 0.948, a melting point of 116–117° C., a melt index of 1.0 and copolymerizes to the extent that it contains 5.0% by weight of dibutyl maleate. The solubility test in boiling xylene shows that no "gel" (i.e. crosslinked material) has formed in the product.

About 24 grams of the resulting pellets are compression molded into 0.02" x 8" x 8" plaques by pressing them in a mold (preheated to a temperature of 300–310° F.) for 4 minutes at 1 ton pressure. The pressure is then increased to 15 tons. The mold is "bumped" by reducing the pressure to 5 tons and increasing it again to 15 tons. The "bumping" is done 3 times and then heated for 5 minutes at 15 tons pressure. The mold is cooled by trickling water through the press (Pasadena Hydraulic Co. press) until the mold is at room temperature.

Procedure B—Control

As a control to the preceding procedure, a high density polyethylene copolymer containing 1.59% of butene-1 is prepared in accordance with United States Patent 2,825,721, as previously described, at about 272° F. so as to give a polyethylene/butene-1 copolymer having a density of 0.950, a melting point of 127–128° C. and a melt index of 1.0, which values substantially correspond to the density and melt index of the polyethylene/butene-1/dibutyl maleate graft copolymer resulting from the above procedure.

Pellets of the copolymer are compression molded into plaques according to the method set forth in Procedure A.

The resulting properties of the two polymers are given in Table I.

TABLE I

|  | A | Control B |
|---|---|---|
| Percent Dibutyl Maleate Incorporation | 5.0 | 0.0 |
| Density | 0.948 | 0.950 |
| Melt Index | 1.0 | 1.0 |
| Percent Elongation | 1,100 | 70 |
| Tensile Strength at Yield, p.s.i. | 2,570 | 3,900 |
| Ultimate Tensile Strength, p.s.i. | 3,170 | (¹) |
| Notched Impact Brittleness Temp., ° C. | −53 | −35 |
| Stiffness In Flexure, p.s.i. at 110 mils | 47,600 | 82,000 |

¹ Breaks at yield point.

As shown by the notched impact brittleness temperature the percent elongation and the tensile strength at yield, the polyethylene/butene-1/dibutyl maleate graft copolymer has a lower brittleness temperature and will stretch to a much greater extent than the control copolymer. As shown by the stiffness in flexure, the new graft copolymer is much more flexible and resistant to impact than the control copolymer.

To confirm the improved resistance to impact of the graft copolymer, polymers A and B are blow-molded into 26 ounce capacity bottles. The bottles blown from polymer A are quite clear whereas those blown from polymer B are hazy. The resulting bottles are subjected to the impact resistance Test 1, previously described. The results of the test are given in Table II.

The polymers A and B are also tested, as previously described, as to their resistance to environmental stress cracking. The results of the test are given in Table II.

TABLE II

| | | |
|---|---|---|
| Impact Resistance (Test 1) | 12 ft., no breakage. 26 ft., no breakage. | 12 ft., 50% breakage. |
| Environmental Stress Cracking | 200 hours | 40 hours. |

As shown by the tests, the graft copolymers of the present invention have substantially improved impact resistance and, in addition, are much more resistant to environmental stress cracking.

Procedure C—Control

In order to demonstrate that the dibutyl maleate adds to the double bonds of the polyethylene to form a true graft copolymer, rather than a crosslinked material, a high density polyethylene homopolymer is prepared in accordance with U.S. Patent 2,825,721, as previously described, employing a temperature of about 262° F. so as to give a homopolymer having a density of 0.960 and a melt index of 0.2.

The high density polyethylene homopolymer is then hydrogenated using a Raney nickel catalyst, 150 p.s.i.g. of hydrogen pressure, a temperature of 300° F. and a hydrogenation time of 20 hours. The catalyst is removed from the polymer in the conventional manner. Infrared analysis of the product shows substantially complete hydrogenation of all double bonds in the polymer.

The resulting hydrogenated polyethylene homopolymer is then treated with the dibutyl maleate according to Procedure A above. Infrared analysis of the product shows less than 0.1% of dibutyl maleate in the polymer (probably due to unseparated dibutyl maleate monomer). This test clearly demonstrates that the maleate diester reacts with the double bonds of the polyethylene to form a true graft copolymer rather than a cross-linked material.

EXAMPLE II

A high density polyethylene homopolymer is prepared in accordance with U.S. Patent 2,949,447, as previously described, to give a homopolymer having a density of 0.950, a melt index of 0.0 and an $MI_{21}$ of 0.39.

466 grams of the polyethylene homopolymer are mixed in a ribbon blender with a solution of 114 grams of dibutyl maleate and 7.05 grams of t-butyl hydroperoxide. The homogeneous mixture is fed into a "Sterling" one inch extruder having a length to diameter ratio of 24 to 1 and equipped with electric temperature controls covering 3 heating zones. The feed end is cooled with tap water. The temperature profile is Zone 1=375° F., Zone 2=610° F., Zone 3=395° F. and die temperature=360° F. The die produces a single strand at an extrusion rate of about 3 pounds per hour employing a pressure of about 1,500 p.s.i. The strand is cut into pellets having a size of from about ¼ to 1/16 inch.

The resulting polyethylene/dibutyl maleate graft copolymer has a density of 0.948, a melting point of 116–117° C., a melt index of 0.03 and copolymerizes to the extent that it contains 7.7% by weight of dibutyl maleate.

Pellets of the copolymer are compression molded into plaques according to the method set forth in Procedure A of Example I. The resulting plaques have a tensile strength at yield of 2,250 p.s.i., a percent elongation of 1,010, an ultimate tensile strength of 2,620 p.s.i. and a notched impact brittleness temperature of −50° C. The graft copolymer, when subjected to the environmental stress cracking test, lasted approximately 1,400 hours.

EXAMPLE III

A high density polyethylene homopolymer is prepared in accordance with U.S. Patent 2,825,721, as previously described, employing a temperature of about 262° F. so as to give a homopolymer having a density of 0.960 and a melt index of 0.2.

800 grams of the polyethylene homopolymer are mixed in a ribbon blender with a solution of 190 grams of diethyl maleate and 10 grams of t-butyl hydroperoxide. The homogeneous mixture is fed into a "Sterling" one inch extruder having a length to diameter ratio of 24 to 1 and equipped with electric temperature controls covering 3 heating zones. The feed end is cooled with tap water. The temperature profile of the three zones is Zone 1=289° F., Zone 2=410° F., Zone 3=400° F. and die temperature=360° F. A pressure of about 2,200 p.s.i. is employed in the extruder. The die produces a single strand which is cut into pellets having a size of from about ¼ to 1/16 inch.

The resulting polyethylene/diethyl maleate graft copolymer has a density of 0.955, a melting point of 116–117° C., a melt index of 0.05 and copolymerizes to the extent that it contains 3.7% of diethyl maleate.

The graft copolymer pellets are compression molded into plaques according to the method set forth in Procedure A of Example I. The properties of the resulting polyethylene/diethyl maleate graft copolymer are compared to the properties of the original polyethylene homopolymer in the table below.

TABLE III

|  | Graft Copolymer | Control |
|---|---|---|
| Percent Diethyl Maleate Incorporation | 3.7 | 0 |
| Density | 0.955 | 0.960 |
| Melt Index | 0.05 | 0.2 |
| Percent Elongation | 538 | 70 |
| Tensile Strength at Yield, p.s.i. | 2,175 | 3,800 |
| Ultimate Tensile Strength, p.s.i. | 2,970 | (1) |
| Notched Impact Brittleness Temp., °C | −25 | +5 |
| Environmental Stress Cracking, hrs. | (2) | 120 |

[1] Breaks at yield point.
[2] Over 16,130 hours.

The above table clearly shows the improved properties of the graft copolymers of the present invention over those of the original polyethylene utilized.

EXAMPLE IV

A high density polyethylene copolymer containing about 1.6% of butene-1 is prepared in accordance with U.S. Patent 2,825,721, as previously described, employing a temperature of about 303° F. so as to give a copolymer having a density of 0.950 and a melt index of 9.0.

841.1 grams of the polyethylene copolymer are mixed in a ribbon blender with a solution of 150 grams of dibutyl maleate and 8.9 grams of t-butyl hydroperoxide. The homogeneous mixture is fed into a "Sterling" one inch extruder having a length to diameter ratio of 24 to 1 and equipped with electric temperature controls covering 3 heating zones. The feed end is cooled with tap water. The temperature profile of the three zones is Zone 1=350° F., Zone 2=585° F., Zone 3=345° F. and die temperature=300° F. The die produces a single strand at an extrusion rate of about 3.3 pounds per hour employing a pressure of about 775 p.s.i.

The resulting polyethylene/butene-1/dibutyl maleate grafts copolymer has a density of about 0.950, a melt index of 35.3 and copolymerizes to the extent that it contains 7.8% by weight of dibutyl maleate.

Pellets of the copolymer are compression molded into plaques according to the method set forth in Procedure A of Example I. The resulting plaques have a tensile strength at yield of 1,900 p.s.i. and a percent elongation of 65.

EXAMPLE V

*Procedure A*

A high density polyethylene copolymer containing about 1.59% of butene-1 is prepared in accordance with U.S. Patent 2,949,447, as previously described, to give a copolymer having a density of 0.943, a melt index of 0.0 and an MI$_{21}$ of 1.6.

78.6 pounds of the polyethylene copolymer are mixed in a ribbon blender with a solution of 20 pounds of diethyl maleate and 1.4 pounds of t-butyl hydroperoxide. The homogeneous mixture is fed into a "Killion" one inch extruder having a length to diameter ratio of 24 to 1 and equipped with electric temperature controls covering 6 heating zones. The feed end is cooled with tap water and the screw speed is 23 r.p.m. The temperature profile is Zone 1=370° F., Zone 2=610° F., Zone 3=520° F., Zone 4=490° F., Zone 5=460° F., Zone 6=450° F. and die temperature = 305° F. The pressure in the extruder is about 500 p.s.i. The extruded product is cut into pellets having a size of from about ¼ to ¹⁄₁₆ inch.

The resulting polyethylene/butene-1/diethyl maleate graft copolymer has a density of 0.958, a melting point of 116–117° C., a melt index of 7.5 and copolymerizes to the extent that it contains 7.3% by weight of diethyl maleate.

Pellets of the polyethylene/butene-1/diethyl maleate graft copolymer are compression molded into plaques according to the method set forth in Procedure A of Example I.

The properties of the graft copolymer and the plaques are summarized in Table IV.

*Procedure B—Control*

As a control to the preceding procedure, a high density polyethylene copolymer containing about 1.6% of butene-1 is prepared in accordance with U.S. Patent 2,825,721, as previously described, employing a temperature of about 303° F. so as to give a polyethylene copolymer having a density of 0.950, a melting point of 127–128° C. and a relatively high melt index of 9.0 which roughly corresponds to the melt index of 7.5 of the graft copolymer of Procedure A.

Pellets of the copolymer are compression molded into plaques according to the method set forth in Procedure A of Example I. The properties of the polymer and the resulting plaques are summarized in Table IV.

TABLE IV

|  | A | Control B |
|---|---|---|
| Percent Maleate Incorporation | 7.3 | 0.0 |
| Density | 0.958 | 0.950 |
| Melt Index | 7.5 | 9.0 |
| Percent Elongation | 360 | 50 |
| Tensile Strength at Yield, p.s.i. | 2,100 | 3,900 |
| Ultimate Tensile Strength, p.s.i. | 2,400 | (1) |
| Notched Impact Brittleness Temp., °C | −2.5 | +10 |
| Environmental Stress Cracking, hrs. | 2.6 | (2) |
| Impact Resistance, ft. lbs. (Test 2) | Over 35 | (2) |

[1] Breaks at yield point.
[2] Breaks on bending.

EXAMPLE VI

A high density polyethylene copolymer containing about 1.59% of butene-1 is prepared in accordance with U.S. Patent 2,949,447, as previously described, to give a copolymer having a density of 0.943, a melt index of 0.0 and an MI$_{21}$ of 1.6.

848 grams of the polyethylene copolymer are mixed in a ball mill with 150 grams of dicyclohexyl maleate and 2.0 grams of t-butyl hydroperoxide. The homogeneous mixture is fed into a "Sterling" one inch extruder having a length to diameter ratio of 24 to 1, and equipped with electric temperature controls covering three heating zones. The feed end is cooled with tap water and the screw speed is 30 r.p.m. The temperature profile is Zone 1=395° F., Zone 2=593° F., Zone 3=395° F. and die temperature = 353° F. The die produces 1 strand which is pelletized in the conventional manner by cutting. The dimensions of the pellets are about ¹⁄₁₀ to ¼ inch and the rate of extrusion is 3 pounds per hour, employing a pressure of 2,600 to 3,000 p.s.i.

The resulting polyethylene/butene-1/dicyclohexyl maleate graft copolymer has a density of 0.944, a melt index of 0.45 and copolymerizes to the extent that it contains 3.2% by weight of dicyclohexyl maleate.

Pellets of the product are recrystallized from xylene four times. The resulting polymer is molded into plaques according to Procedure A of Example I. The tensile strength at yield of the product is 3,120 p.s.i. and the percent elongation is 83%.

EXAMPLE VII

A high density polyethylene copolymer containing about 1.59% of butene-1 is prepared in accordance with U.S. Patent 2,949,447, as previously described, to give a copolymer having a density of 0.943, a melt index of 0.0 and an MI$_{21}$ of 1.6.

278.45 grams of the polyethylene copolymer are mixed in a ball mill with 220.5 grams of dioctadecyl maleate and 1.05 grams of t-butyl hydroperoxide. The homogeneous mixture is processed into pellets by employing the "Sterling" one inch extruder as is described in Example VI. The resulting pellets are molded into plaques according to Procedure A of Example I.

The properties of the plaques and the polyethylene/butene-1/dioctadecyl maleate graft copolymer are given below.

Percent dioctadecyl maleate incorporation _____ 9.15
Density _____ 0.946
Melt index _____ 0.46
Percent elongation _____ 486
Tensile strength at yield, p.s.i. _____ 3,400
Ultimate tensile strength, p.s.i. _____ 2,900

EXAMPLE VIII

A high density polyethylene copolymer containing about 1.59% of butene-1 is prepared in accordance with U.S. Patent 2,949,447, as previously described, to give a polyethylene polymer having a density of 0.943, a melt index of 0.0 and an $MI_{21}$ of 1.6.

Approximately 848 grams of the polyethylene copolymer are mixed in a ball mill with 150 grams of diisobutyl maleate and 2 grams of t-butyl hydroperoxide. The resulting homogeneous mixture is fed into a "Sterling" one inch extruder having a length to diameter ratio of 24 to 1 and equipped with electric temperature controls covering three heating zones. The feed end is cooled with tap water and the screw speed is 30 r.p.m. The temperature profile is Zone 1=400° F., Zone 2=590° F., Zone 3=400° F. and die temperature =340° F. The die produces 1 strand which is pelletized in the conventional manner by cutting. The dimensions of the pellets are about 1/10 to 1/4 inch and the rate of extrusion is 3 pounds per hour employing a pressure of 2,600 to 3,000 p.s.i.

The resulting polyethylene/butene-1/diisobutyl maleate graft copolymer has a density of 0.947, a melt index of 0.7 and copolymerizes to the extent that it contains about 5% by weight of diisobutyl maleate.

Pellets of the product are recrystallized from xylene four times. The resulting polymer is molded into plaques according to Procedure A of Example I.

The plaques, when tested, have a percent elongation of 475, a tensile strength at yield of 3,040 p.s.i. and an ultimate tensile strength of 2,200 p.s.i.

EXAMPLE IX

When the procedure of Example VI is repeated employing p-chlorophenyl methyl maleate, rather than dicyclohexyl maleate, a polyethylene/butene-1/p-chlorophenyl methyl maleate graft copolymer is obtained having properties similar to the product of Example VI.

While in the above examples unmodified high density polyethylene/maleate diester graft copolymers are produced, it is obvious that other materials such as dyes, pigments, fibers and other polymers may be introduced into the graft copolymer of the present invention without substantial alteration of the physical properties of the structures formed from such compositions.

The high density polyethylene/maleate diester graft copolymers formed in accordance with the present invention can be fabricated into useful articles such as bottles, toys, sheets and films in the same manner as the original high density polyethylene homopolymer or copolymer. For example, the graft copolymers of the present invention can be blow-molded, injection molded, compression molded, or extended into films, bottles, tubing, filaments, sheets, wrapping materials and the like.

Many equivalent modifications will become apparent to those skilled in the art from a reading of the foregoing without a departure from the inventive concept.

What is claimed is:

1. A graft copolymer of (A) a polyethylene polymer having a density of at least about 0.940 and containing at least about 90% by weight of ethylene in the polymer chain and (B) a maleic acid diester; the maleic acid diester being present in the graft copolymer in amounts of from about 0.5 to about 12% by weight.

2. A graft copolymer of (A) a polyethylene polymer having a density of from about 0.942 to about 0.965 and containing at least about 90% by weight of ethylene in the polymer chain and (B) a maleic acid diester; the maleic acid diester being present in the graft copolymer in amounts of from about 3 to about 10% by weight.

3. A graft copolymer of (A) a polyethylene homopolymer having a density of from about 0.942 to about 0.965 and (B) a maleic acid diester; the maleic acid diester being present in the graft copolymer in amounts of from about 3 to about 10% by weight.

4. A graft copolymer of (A) a polyethylene copolymer having a density of from about 0.942 to about 0.955 and containing at least about 98% by weight of ethylene and up to about 2% by weight of an α-olefin comonmer and (B) a maleic acid diester; the maleic acid diester being present in the graft copolymer in amounts of from about 3 to about 10% by weight.

5. The graft copolymer of claim 2 wherein each alcohol residue of the maleic acid diester is a hydrocarbon radical containing from 1 to about 18 carbon atoms.

6. The graft copolymer of claim 2 wherein each alcohol residue of the maleic acid diester is a hydrocarbon radical containing from about 4 to about 18 carbon atoms.

7. The graft copolymer of claim 2 where in the maleic acid diester is dibutyl maleate.

8. The graft copolymer of claim 2 wherein the maleic acid diester is dioctadecyl maleate.

9. The graft copolymer of claim 2 wherein the maleic acid diester is diethyl maleate.

10. The graft copolymer of claim 2 wherein the maleic acid diester is dicyclohexyl maleate.

11. The graft copolymer of claim 2 wherein the maleic acid diester is diisobutyl maleate.

12. A process for producing a graft copolymer which comprises heating a composition comprising (A) from about 70 to about 99% by weight of a polyethylene polymer having a density of at least about 0.940 and containing at least about 90% by weight of ethylene in the polymer chain and (B) from about 0.5 to about 30% by weight of a maleic acid diester, to a temperature above the melting point of the said polyethylene polymer, mixing the molten composition in the presence of at least about 0.02% by weight, based on the weight of said composition, of a hydroperoxide having a half life of at least one minute at 145° C. and thereafter recovering the graft copolymer.

13. A process for producing a graft copolymer which comprises heating a composition comprising (A) from about 80 to about 90% by weight of a polyethylene polymer having a density of from about 0.942 to about 0.965 and containing at least about 98% by weight of ethylene in the polymer chain and (B) from about 10 to about 20% by weight of a maleic acid diester, to a temperature above the melting point of the said polyethylene polymer, mixing the molten composition in the presence of from about 0.1 to about 5% by weight, based on the weight of said composition, of a hydroperoxide having a half life of at least one minute at 145° C. and thereafter recovering the resulting graft copolymer.

14. A process for producing a graft copolymer which comprises heating a composition comprising (A) from about 80 to about 90% by weight of a polyethylene homopolymer having a density of from about 0.942 to about 0.965 and (B) from about 10 to about 20% by weight of a maleic acid diester, to a temperature above the melting point of the said polyethylene polymer, mixing the molten composition in the presence of from about 0.1 to about 5% by weight, based on the weight of said composition, of a hydroperoxide having a half life of at least one minute at 145° C. and thereafter recovering the resulting graft copolymer.

15. A process for producing a graft copolymer which comprises heating a composition comprising (A) from about 80 to about 90% by weight of a polyethylene copolymer having a density of from about 0.942 to about 0.955 and containing at least about 98% by weight of ethylene and up to about 2% by weight of an α-olefin comonomer and (B) from about 10 to about 20% by weight of a maleic acid diester, to a temperature above the melting point of the said polyethylene polymer, mixing the molten composition in the presence of from about 0.1 to about 5% by weight, based on the weight of said composition, of a hydroperoxide having a half life of at least one minute at 145° C. and thereafter recovering the resulting graft copolymer.

16. The process of claim 13 wherein each alcohol residue of the maleic acid diester is a hydrocarbon radical containing from 1 to about 18 carbon atoms.

17. The process of claim 13 wherein each alcohol residue of the maleic acid diester is a hydrocarbon radical containing from about 4 to about 18 carbon atoms.

18. The process of claim 13 wherein the hydroperoxide is t-butyl hydroperoxide.

19. The process of claim 13 wherein the maleic acid diester is dibutyl maleate.

20. The process of claim 13 wherein the maleic acid diester is dioctadecyl maleate.

21. The process of claim 13 wherein the maleic acid diester is diethyl maleate.

22. The process of claim 13 wherein the maleic acid diester is dicyclohexyl maleate.

23. The process of claim 13 wherein the maleic acid diester is diisobutyl maleate.

References Cited by the Examiner

UNITED STATES PATENTS 3,166,607   1/1965   Cernia _____ 260—878

FOREIGN PATENTS 885,969   1/1962   Great Britain.

OTHER REFERENCES

Gaylord: "Linear and Stereoregular Addition Polymers," p. 145, June 11, 1959.

JOSEPH L. SCHOFER, *Primary Examiner.*

F. L. DENSON, *Assistant Examiner.*